(12) United States Patent
Tantawy et al.

(10) Patent No.: US 6,597,891 B2
(45) Date of Patent: *Jul. 22, 2003

(54) COMBINING ONLINE BROWSING AND ON-DEMAND DATA BROADCAST FOR SELECTING AND DOWNLOADING DIGITAL CONTENT

(75) Inventors: Ahmed Tantawy, Yorktown Heights, NY (US); Franco Marconcini, New York, NY (US); Jonathan P. Munson, Chapel Hill, NC (US); Giovanni Pacifici, New York, NY (US); Aba S. Youssef, Jefferson Valley, NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/293,338

(22) Filed: Apr. 16, 1999

(65) Prior Publication Data

US 2003/0009770 A1 Jan. 9, 2003

Related U.S. Application Data

(60) Provisional application No. 60/127,690, filed on Apr. 5, 1999.

(51) Int. Cl.[7] .................................................. H04H 1/00
(52) U.S. Cl. ................................... 455/3.05; 705/1
(58) Field of Search ............................. 455/3.01, 3.03, 455/3.04, 3.05; 380/281, 279; 705/51

(56) References Cited

U.S. PATENT DOCUMENTS

| | | | | |
|---|---|---|---|---|
| 5,455,570 A | * | 10/1995 | Cook et al. | 340/825.22 |
| 5,572,442 A | * | 11/1996 | Schulhof et al. | 364/514 |
| 5,742,893 A | * | 4/1998 | Frank | 455/66 |
| 5,819,160 A | * | 10/1998 | Foladare et al. | 455/45 |
| 6,226,618 B1 | * | 5/2001 | Downs et al. | 705/1 |
| 6,263,313 B1 | * | 7/2001 | Milsted et al. | 705/1 |
| 6,367,019 B1 | * | 4/2002 | Ansell et al. | 713/201 |

OTHER PUBLICATIONS

Electronic Distribution System from N2K Corporation at online URL www.n2k.com (a/k/a Music Boulevard).

* cited by examiner

*Primary Examiner*—Nguyen T. Vo
*Assistant Examiner*—Nghi H. Ly
(74) *Attorney, Agent, or Firm*—Jon A. Gibbons; Fleit, Kain, Gibbons, Gutman & Bongini P.L.; David M. Shofi

(57) ABSTRACT

A method for receiving digital content data on a user's system for playing or recording, the content data being compressed and encrypted with a first encrypting key, said method comprising the steps of: tuning a receiver to a selected frequency; receiving content data through a broadcast transmission at the selected frequency; assembling the content data that is received; and transferring the content data to a player for playing the content data after all the content data has been received.

In accordance with another embodiment of the present invention, an information processing system and computer readable medium is disclosed for carrying out the above method.

20 Claims, 5 Drawing Sheets

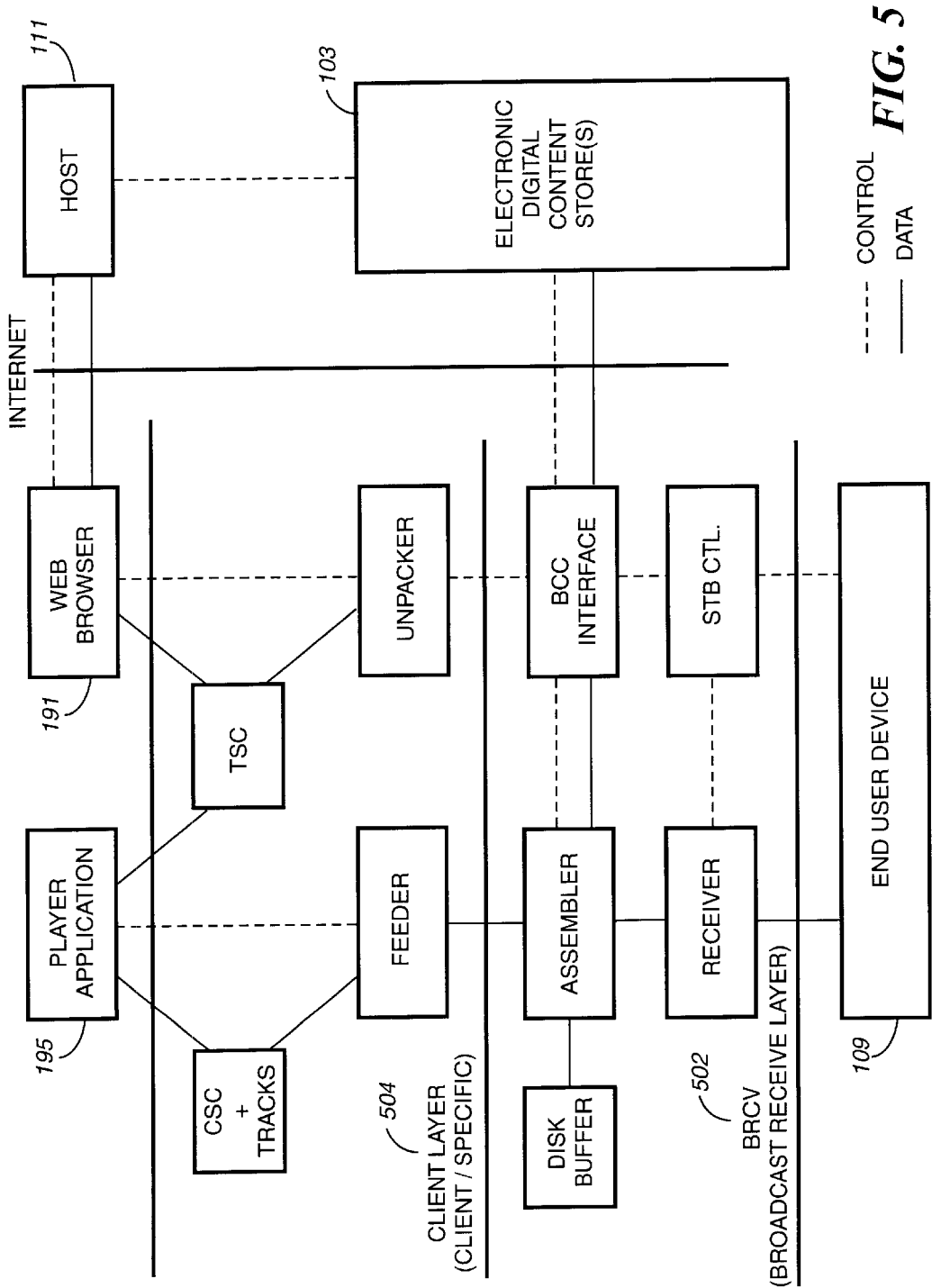

COMBINING ONLINE BROWSING AND ON-DEMAND DATA BROADCAST FOR SELECTING AND DOWNLOADING DIGITAL CONTENT

CROSS-REFERENCE TO RELATED APPLICATIONS

This application claims the benefit of U.S. Provisional Application No. 60/127,690, filed on Apr. 5, 1999, the contents of which are incorporated herein.

BACKGROUND OF THE INVENTION

1. Field of the Invention

The invention disclosed broadly relates to the field of electronic commerce and more particularly to a system and related tools for the secure delivery and rights management of digital assets, such as print media, films, games, and music over broadcast-based systems.

2. Description of the Related Art

The use of global distribution systems such as the Internet for distribution of digital assets such as music, film, computer programs, pictures, games and other content continues to grow. At the same time owners and publishers of valuable digital content have been slow to embrace the use of the Internet for distribution of digital assets for several reasons. One reason is that owners are afraid of unauthorized copying or pirating of digital content. The electronic delivery of digital content removes several barriers to pirating. One barrier that is removed with electronic distribution is the requirement of the tangible recordable medium itself (e.g., diskettes or CD ROMs). It costs money to copy digital content on to tangible media, albeit, in many cases less than a dollar for a blank tape or recordable CD. However, in the case of electronic distribution, the tangible medium is no longer needed. The cost of the tangible medium is not a factor because content is distributed electronically. A second barrier, is the format of the content itself, that is, how the content stored in an analog format or a digital format. Content stored in an analog format, for example, a printed picture, when reproduced by photocopying, the copy is of lesser quality than the original. Each subsequent copy of a copy, sometimes called a generation, is of less quality than the original. This degradation in quality is not present when a picture is stored digitally. Each copy, and every generation of copies can be as clear and crisp as the original. The aggregate effect of perfect digital copies combined with the very low cost to distribute content electronically and to distribute content widely over the Internet makes it relatively easy to pirate and distribute unauthorized copies. With a couple of keystrokes, a pirate can send hundreds or even of thousands of perfect copies of digital content over the Internet. Therefore a need exists to ensure the protection and security of digital assets distributed electronically.

Providers of digital content desire to establish a secure, global distribution system for digital content that protects the rights of content owners. The problems with establishing a digital content distribution system includes developing systems for digital content electronic distribution, rights management, and asset protection. Digital content that is distributed electronically includes content such as print media, films, games, programs, television, multimedia, and music.

One secure electronic system is described in the co-pending application Ser. No. 09/133,519, filed Aug. 13, 1998 by Edgar DOWNS et al. for "CONTENT DELIVERY SYSTEM" which is commonly assigned herewith to IBM and is incorporated by reference in its entirely.

One electronic distribution system available today is from N2K Corporation at online URL www.n2k.com known as Music Boulevard. The electronic distribution of digital content, specifically music titles from this site uses ftp (file transfer protocol) in the context of the Internet through POTS (plain old telephone systems) and cable services. The distribution of digital content over limited bandwidth transmission channels such as the Internet, although very popular, are not without their shortcoming.

One shortcoming for the distribution of digital content over limited bandwidth transmission channels is the amount of time it takes to download a large amount of content over limited network. For large content such as music and film, the time to download content can be very long. The existing Internet online stores and content repositories that rely on low speed unicast connections in delivering digital content to the client systems. Accordingly, a need exists for a method and a system that combines the convenience and ease of use of the Internet so that it is transparent to existing systems including both the end-user applications and the content repositories, and which utilizes a unicast channel.

Another shortcoming for the distribution of digital content over limited bandwidth transmission channels is the cost associated with higher speed network connections. Many times consumers and end-users of digital content what to chose their mode of delivery. This is analogous to a customer choosing expedited shipping versus normal mail shipping where the cost of the shipping can change depending on the speed of delivery. Therefore, a need exists for a system that can downloaded digital content over both broadcast channels medium such as cable TV and satellite TV or over the POTS (Plain Old Telephone System) according to the customer's selection on cost versus delivery time.

Still another shortcoming for the distribution of digital content over limited bandwidth transmission channels is the problem with availability. In all localities the availability of broadcast, cable and faster Internet services may not be available. Accordingly, a need exists for system that can provide and end-user the ability to download content based on the type of connectivity that is transparent to an end-user.

Yet, still another shortcoming for the distribution of digital content over limited bandwidth transmission channels is the problem with reliability. The use of broadcast media an wireless media does not provide the error checking and control as typically found in wired transmissions channels. Providing the ability to a user to select between wire and wireless forms of content delivery must therefore maintain the same degree of reliability. Accordingly, a need exists for system that can provide and end-user the reliability over both wire and wireless types of connectivity that is transparent to the end-user.

SUMMARY OF THE INVENTION

Briefly in accordance with the invention, a system for online shopping and/or requesting of digital content, and on-demand download of the selected content over a broadcast medium is presented. Over a typical unicast network connection, the end-user is provided with a user interface for browsing a set of offerings and placing a request or purchase order. The system then schedules the download of the electronically ordered digital content over a satellite or cable broadcast medium. The MPEG-2 standard transport stream for the broadcast transmission of the digital content is one embodiment for this system, that allows the solution to be deployed over virtually all types of digital broadcast systems. The unicast network connection may be utilized as a back channel for retransmission of corrupted data blocks, in a way that reduces the overall download time. The downloaded content is assembled in the host from which the request for download originated, and is presented to the consuming application in a manner that hides the details of the broadcast medium and makes it appear as if it was a typical unicast channel. Thus, the same end-user application and content repository can be used while the actual communication medium may be either the Internet or a broadcast network or a similar infrastructure, based on criteria such as the available type of connectivity, cost, speed, and more.

BRIEF DESCRIPTION OF THE DRAWINGS

FIG. 5 is a block diagram of the Content Host Emulator of FIG. 1 illustrating the two layers according to the present invention.

DETAILED DESCRIPTION OF AN EMBODIMENT

The co-pending application Ser. No. 09/133,519, filed Aug. 13, 1998 by Edgar DOWNS et al. for "CONTENT DELIVERY SYSTEM" (Herein after the '519 patent application), now U.S. Pat. No. 6,226,618, which is commonly assigned herewith to IBM and is incorporated by reference in its entirety. The terms Content Host(s) 111, Electronic Digital Content Store(s) 103, End User Devices 109, Secure Containers (not shown), Online catalog or Content Database 180, Player Application 195, Web Browser 191, are described in the '519 patent application and shown in FIG. 1 of the '519 patent application. Moreover the term Digital Content or simple Content refers to information and data stored in a digital format including: pictures, movies, videos, music, programs, multimedia and games.

Figure 1:
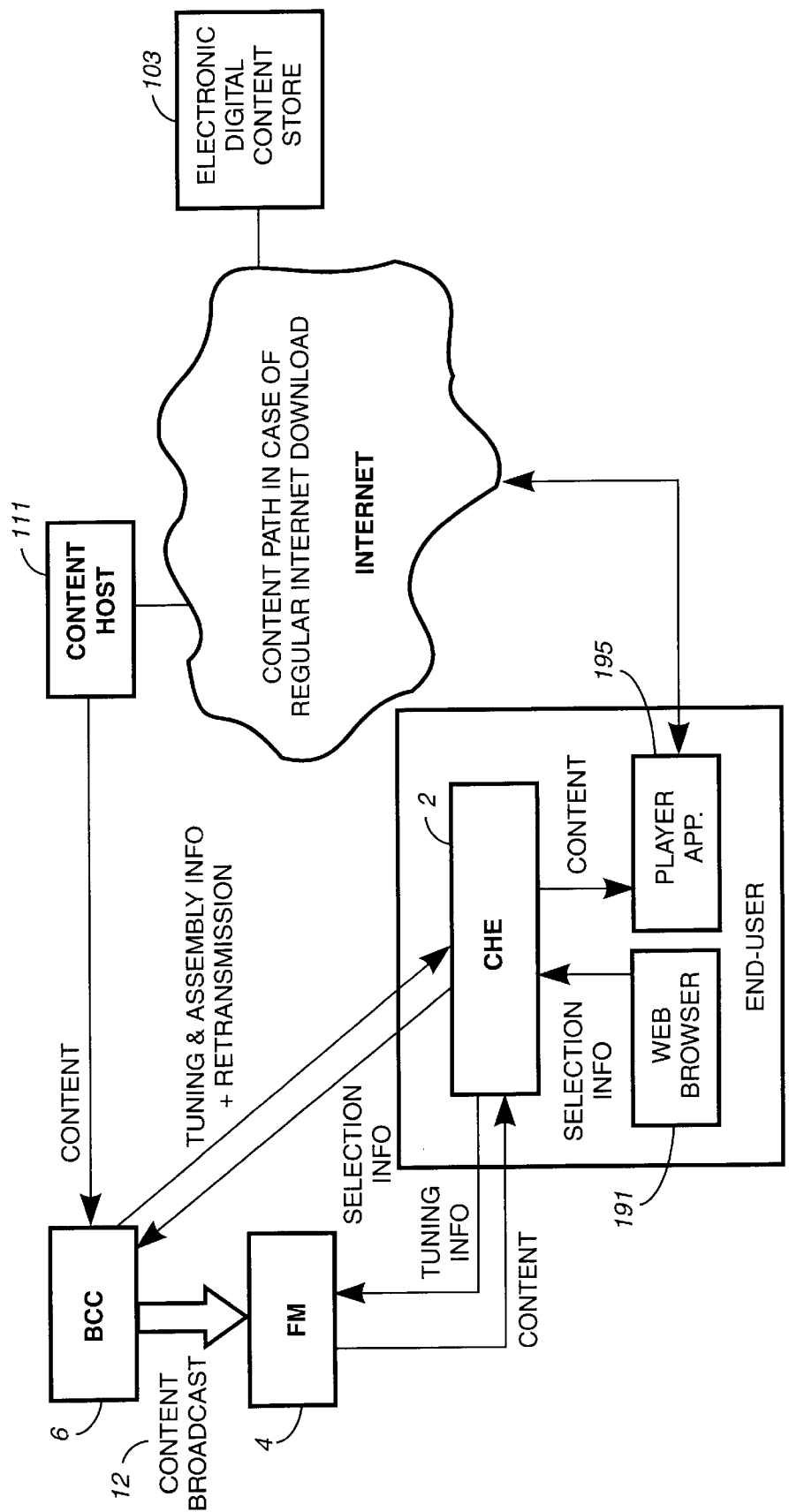
FIG. 1 is block diagram of the principle components of the system according to the present invention.

Referring now in more detail to the drawings in which like numerals refer to like parts throughout several views, FIG. 1 is a block diagram illustrating the principle components in the Content Delivery System 10 according to the present invention. The Content Delivery System 10 is comprised of a Content Host(s) 111 for storing Digital Content that has been packaged in Secure Containers (not shown). An End User Device(s) 109 are coupled to the Content Host(s) 111 via a network providing unicast transmissions such as the Internet. An Electronic Digital Content Store(s) 103 contain an online catalog or Content Database 180 of titles or available Digital Content that can be viewed with a Web Browser 191. A purchaser using an End User Device(s) (109) with Web Browser 191, can browse the Content Database 180 of the Electronic Store(s) 109. Once the steps of credit authorization as described in the '519 patent application are performed. The selected Digital Content that has been packaged in a secured container. The End-User Device(s) 109 decrypts, decompress and enables the Digital Content received. In a music example, once the Digital Content is received, it can be played on Player Application 195.

The components of the broadcast transmission system are now described. Continuing with FIG. 1, a Content Host emulator (CHE) 2 coupled to an End-User Device(s) 109, a Filtering Module (FM) 4, and a Broadcast Control Center (BCC) 6. The Broadcast Control Center 6 software runs on a server (not shown) that is connected to broadcast transmission equipment such as cable television or satellite distribution. The Broadcast Control Center 6 transmits secured containers containing Digital Content packets 12 via wire and wireless telecommunications networks as sequences of packets to the Filter Module 4. The Filtering Module 4 is coupled to the End User Device(s) 109. In this embodiment, the End User Device(s) 109 is a set-top box or an information processing device such as PC with the necessary multicast broadcast reception electronic including a receiver or timer. The main function of the Filtering Module 4 is to extract the selected packets of Digital Content packets 12 being received from the Broadcast Control Center 6. The Content Host Emulator 2 receives selected packets of Digital Content packers 12 from the Filtering Module 4, assembles them in their package order, and presents them to the Player Application 195. The Filtering Module 4 and Content Host Emulator 2 are logical modules and may or may be embodied as distinct software applications modules or just part of the Player Application 195. In addition, the Filtering Module 4 and the Content Host Emulator 2 may or may not execute on separate physical devices.

In the broadcast transmission mode, upon the completion of a purchase through the Web Browser 191, the Content Host Emulator 2 is started on the End User Device(s) 109. The Content Host Emulator 2 emulates the rote of the Content Host 111 that would have been otherwise contacted in a unicast system as described in the '519 patent application. From the perspective of the Player Application 195 that receives the purchased Digital Content, the Content Host Emulator 2 acts as the remote Content Host 111, that is taught in the '519 patent application from which a network connection is established to download the selected Digital Content. The only difference is that it is executed locally to the End User Device(s) 109

The Content Host Emulator 2 passes information regarding the user selection, obtained from the Electronic Digital Content Store 103. The Content Host Emulator 2 contacts the Broadcast Control Center 6 and passes on the selection information. Upon receiving the selection information, the Broadcast Control Center 6 validates the request as done with the Content Host 111 in the '519 patent application with a clearing house authority. Once the authorization is received, the Broadcast Control Center 6 schedules the transmission of the selected Digital Content.

Next, the Broadcast Control Center 6 sends back the scheduled times (the Digital Content could be scheduled for multiple transmission periods at a future time), together with tuning identification information and assembly information. The tuning identification information is needed by the Filtering Module 4 to properly filter the desired data packets from the broadcast stream. The assembly information is needed by the Content Host Emulator 2 in order to properly assemble the package and present it in the format expected by the Player Application 195. The Content Host Emulator 2 presents the received schedule to the End User Device(s) 109, and allows the user to select among the one or more scheduled download transmission times that they are available.

At the scheduled download time as selected by the user, the Content Host Emulator 2 wakes up and informs the Broadcast Control Center 6 that it is listening to the transmission of that package. It also contacts the Filtering Module 4 running on the set-top box and transfers the tuning information that was received from the Broadcast Control Center 6. The Filtering Module 4 tunes to the specified digital channel and begins filtering the desired package packets out of the multiplexed broadcast stream. The Filtering Module 4 detects transmission errors, by performing cyclic redundancy checks, for example, and suppresses corrupted blocks. The filtered data blocks are transmitted to the Content Host Emulator 2 which reassembles the package. Upon successful reassembly of the package, the Content Host Emulator 2 sends a FIN (Finish) message to the Broadcast Control Center 6.

At scheduled transmission times, the Broadcast Control Center 6 inserts the package into the broadcast stream as a series of data packets. The Broadcast Control Center 6 keeps a record of the number of Content Host Emulator(s) 102 coupled to End User Device(s) 109 which are concurrently downloading a package. In one embodiment, the Broadcast Control Center 6 keeps retransmitting the package in a carousel or cyclical fashion, until it receives the FIN message from all receiving Content Host Emulator(s) 102. This provides reliable end-to-end transmission over the inherently unreliable broadcast medium.

In another embodiment, the Content Delivery System 10 also has the ability to utilize the existence of a network connection between the Broadcast Control Center 6 and the Content Host Emulator 2 to expedite the retransmission of corrupted blocks. Since the number of corrupted blocks is typically very low, the volume of retransmitted data is low and hence it is faster to retransmit these blocks over the network connection using unicast or multicast, as opposed to waiting for a broadcast cycle of packets comprising the digital Content to be performed.

Upon the successful reassembly and formatting of the package, the Content Host Emulator 2 delivers the package to its original destination application, in this example, the Player Application 195 or if encryption is being used by the Secure Container Processor (not shown) as describe in the '519 patent application. At this point, the destination application may proceed normally.

Figure 2:
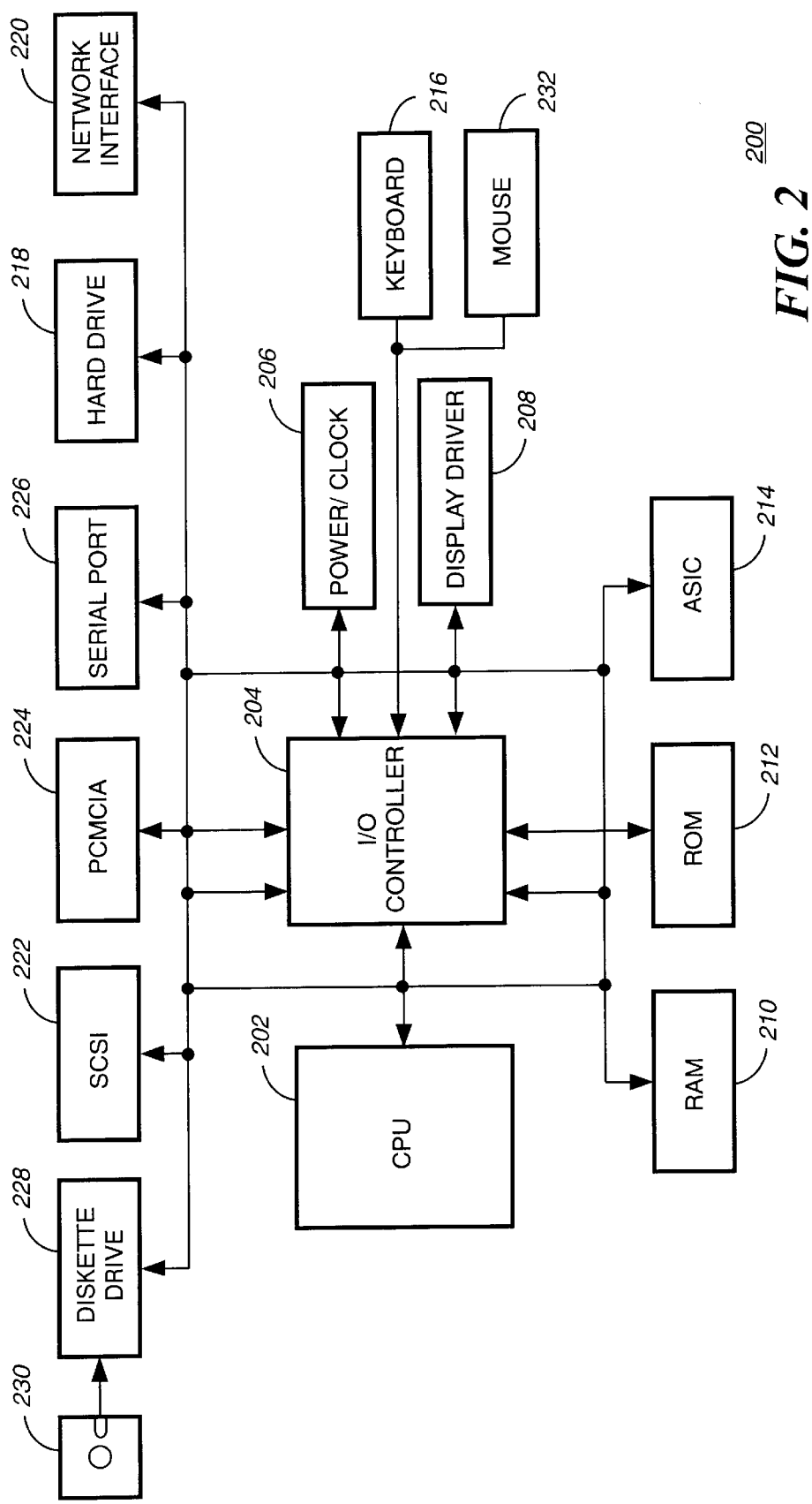
FIG. 2 is a block diagram of the major electrical components of an information processing system for an End User system of FIG. 1 according to the present invention.

Referring to FIG. 2, there is shown a block diagram of the major electrical components of a computer system 200 used in accordance with this invention. The computer system is an example embodiment of the hardware system for the End User Device(s) 109 of FIG. 1. The electrical components of a computer system as well understood and include: a central processing unit (CPU) 202, an Input/Output (I/O) Controller 204, a system power and clock source 206; display driver 208; RAM 210; ROM 212; ASIC (application specific integrated circuit) 214 and a hard disk drive 218. A keyboard 216 with a mouse 232 receives the user input. These are representative components of a computer. The operation of a computer comprising these elements is well understood. Network interface 220 provides connection to a computer network such as Ethernet, TCP/IP or other popular protocol network interfaces. Optional components for interfacing to external peripherals include: a Small Computer Systems Interface (SCSI) port 222 for attaching peripherals; a PCMCIA slot 224; and serial port 226. Filtering Module 4 can be connected to any of the I/O ports (ex. SCSI, Serial, Parallel or Network Interface) of computer system 200. An optional diskette drive 228 is shown for loading or saving code to removable diskettes 230 or equivalent computer readable media such as CD-ROM, removable storage medium and optical character scanning. The system 200 may be implemented by combination of hardware and software. Moreover, the functionality required for using the invention may be embodied in computer-readable media (such as 3.5 inch diskette 230) to be used in programming an information-processing apparatus (e.g., a personal computer) to perform in accordance with the invention.

Figure 3:
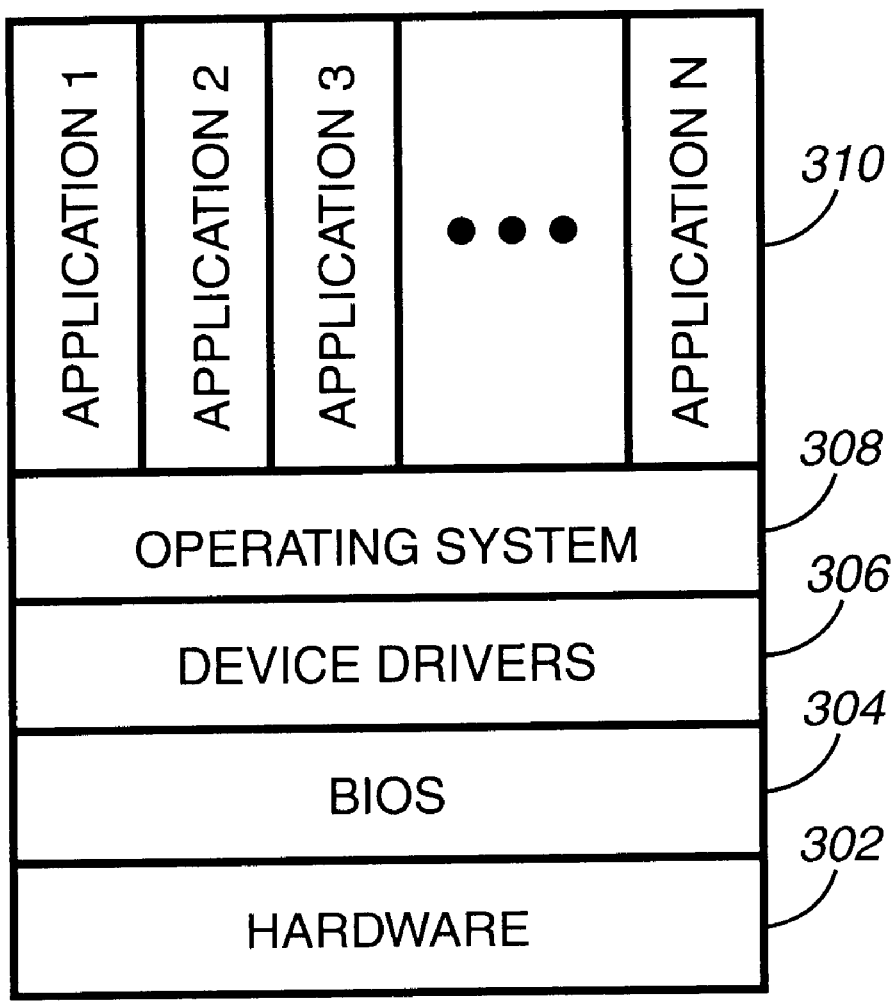
FIG. 3 is a block diagram illustrating the software hierarchy for the information processing device of FIG. 2 according to the present invention.

FIG. 3 is a block diagram illustrating the software hierarchy for the information processing system of FIG. 2 according to the present invention. The hardware 302 is the information processing system of FIG. 2. BIOS (Basic Input Output System) 304 is a set of low level of computer hardware instructions, usually stored in ROM 212, for communications between an operating system 308, device driver(s) 306 and hardware 302. Device drivers 306 are hardware specific code used to communicate between and operating system 308 and hardware peripherals such as a mouse 232, CD ROM drive or printer. Applications 310 are software applications written in C/C++, Java, assembler or equivalent. Example software applications implemented in the present invention such as the Web Browser 191, Player Application 195 and the Content Host Emulator 2. Operating system 308 is the muster program that loads after BIOS 304 initializes, that controls and runs the hardware 302. Examples of operating systems include DOS, Windows 3.1/95/98/NT. Unix. Macintosh. OS/2 and equivalent.

Figure 4:
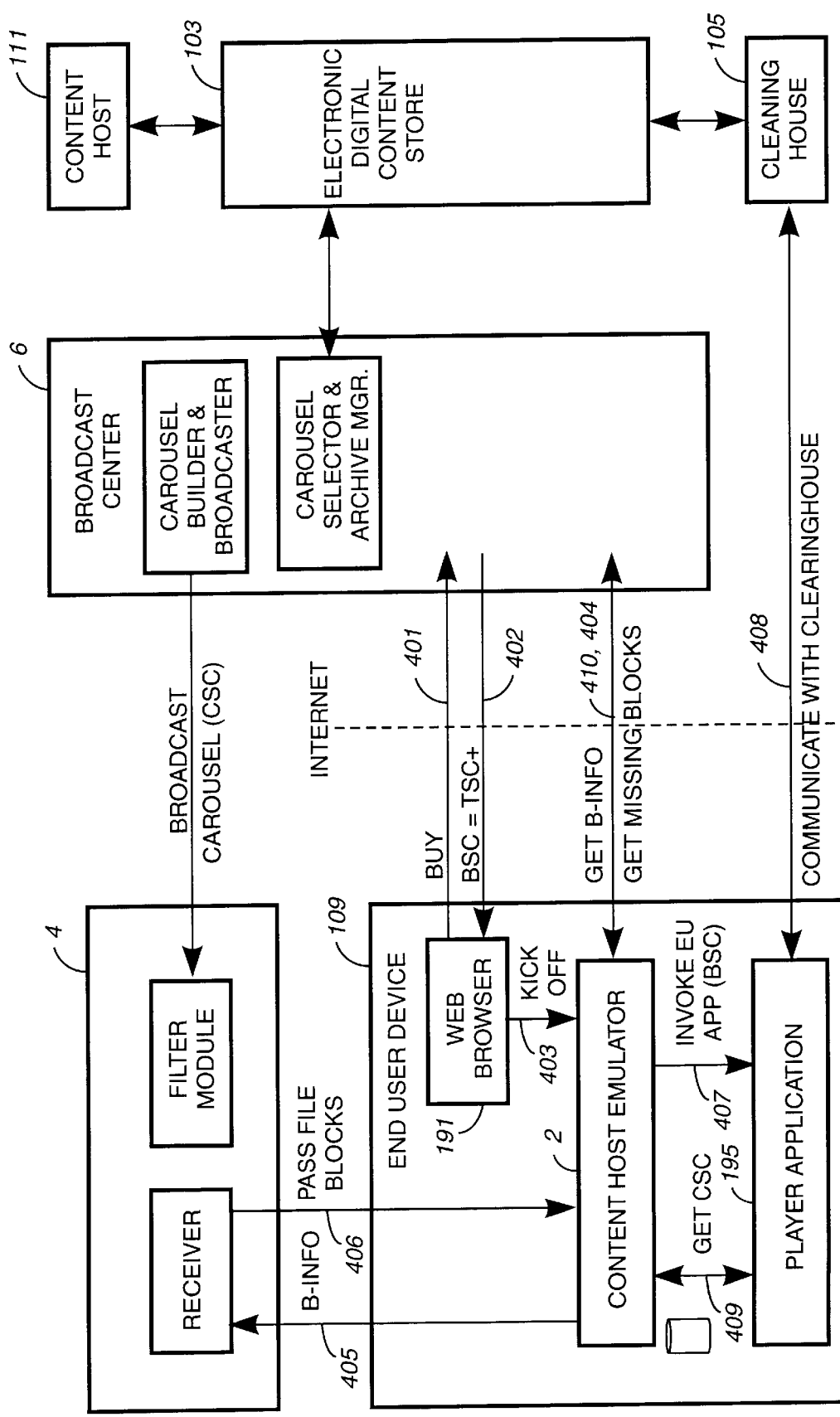
FIG. 4, is a block diagram illustrating the process flow of the system in FIG. 1 according to the present invention.

Turning now to FIG. 4, there is shown a block diagram illustrating the process flow of the broadcast system in FIG. 1 according to the present invention. The process begins with step 401 where the user being presented with an online catalog over Web Browser 191 of available selections in the Content Database 180 of the Electronic Digital Content Store 103. The user makes his/her selection and the Electronic Digital Content Store 103, as taught in the '519 patent application, and store returns to the Web Browser 191 a secure container including the selection identifier and the address of an appropriate broadcast server, step 402. Upon receiving this container, the Web Browser 191 starts the Content Host Emulator 2 and hands off the secured container to it, step 403. Next the Content Host Emulator 2 unpacks the secured container, and notifies the Content Host 111 through Electronic Digital Content Store(s) 103 that this user selection has been ordered as described in the '519 patent application. The Content Host 111 in turn notifies Broadcast Control Center 6 and makes available the secure content container for this user selection, step 405. In step 406, the Broadcast Control Center 6 schedules the transmission of the requested content, and sends the scheduled time to the Content Host Emulator 2 together with tuning information and assembly information and at the scheduled time for download, the Content Host Emulator 2 communicates the tuning info to the End User Device 109, which uses it to tune to the correct digital channel and to filter the requested Digital Content. In step 409, the Filtering Module 4 filters the desired data blocks from the broadcast stream and passes these blocks down to the Content Host Emulator 2 and it assembles the received blocks, possibly requesting retransmissions of missed blocks over a unicast connection to the broadcast server, step 410. Once all data blocks of the requested Digital Content are assembled in order, the Content Host Emulator 2 presents the content in a suitable structure for the Player Application 195.

Turning now to FIG. 5, there is shown a block diagram of the Content Host Emulator 2 of FIG. 1, illustrating the two layers according to the present invention.

Content Host Emulator 2

1. CHE Components

The Content Host Emulator 2 is composed of two main layers: a Broadcast Receive Layer 502 (BRCV) and a client layer 504. The client layer is dependent of the type of Digital Content being received. For example, if the Digital Content is music, the Player Application 195 is used to play music, where the Digital Content is a movie, the player Application 195 is used to play a movie, where the Digital Content is print, the player Application 195 is used to play, render or display the print, where the Digital Content is a program, the player Application 195 plays or performs the program and so on for other types of Digital Content. Accordingly, the term play is used in the broadest context in this present invention to mean play, run, execute, display, render, perform and equivalents thereto. The client layer has been described in the '519 patent application for Player Application 109, the Digital Content Library 196, and the Secure Container Processor 192. The BRCV layer 502 communicates with the receiver tuning hardware coupled to the End User Device(s) 109. The BRCV layer 502 can be implemented along with the client layer 504 on the End User Device(s) 109 or on separate stand along device such as a set top box (STB).

2. Messages Exchanged Between Content Host Emulator 2 and Broadcast Control Center 6

All messages are in Hyper Text Transfer Protocol in style, by being in text format rather than binary format. For this message protocol, each attribute is on a new line that starts with attribute name followed by a colon ":" then the attribute value. The specific messages are now detailed.

2.1. Broadcast Layer Messages

The BRCV 502 is on the End User Device(s) side and BSND is on the side of Broadcast Control Center 6.

| Message type | Attributes | Description |
|---|---|---|
| BRCV2BSND_InitReq | Length:XXXXXXXX<br>Command<br>Version<br>Content-length<br><content as payload> | Carries the payload data of the System client. The payload contains the album selection specified using System layer identifiers. |
| BSND2BRCV_InitReply | Length:XXXXXXXX<br>Command<br>Version<br>Package-ID<br>Package-size<br>Section-size<br>Number-of-sections<br>Number-of-intervals<br>repeat{<br>Channel<br>Mode<br>Program-number<br>Table-ID<br>Start-time<br>End-time<br>}<br>Content-length<br><content as payload> | Package-ID is a Broadcast level identifier for the connection. (Channel, Mode, Program-number, Table-ID) are for tuning the set top box. A Package-size of 0 implies infinite size. A Section-size of 0 implies variable size sections. Number-of-intervals specifies how many times in the future the broadcast of this package is scheduled. The (Start-time, End-time) pair is for scheduling purposes. The message also carries a payload |
| BRCV2BSND_SectionReq | Length:XXXXXXXX<br>Command<br>Version | Request a set of sections over an Internet connection |
| BSND2BRCV_SectionReply | Package-ID<br>Start-section-number<br>End-section-number<br>Length:XXXXXXXX<br>Command<br>Version<br>Package-ID<br>Start-section-number<br>End-section-number<br>repeat{<br>Section-size<br>Section data<br>} | Retransmit a set of sections over an Internet connection. |
| BRCV2BSND_Close | Length<br>Command<br>Version<br>Package-ID | Receiver either completed download or no longer interested in receiving specified package. |
| BCC_ErrorReply | Length<br>Command<br>Version<br>Error-message | Error Reply. |

2.2. Client Layer 504 Messages

These messages are specific to the type of Digital Content. The examples shown are for music Content and are carried as payload of the Broadcast Layer 504 initialization messages. In what follows, MBCC and MCHE stand for the specific layers that act as clients to the broadcast send and receive layers, respectively.

| Message type | Attributes | Description |
|---|---|---|
| MCHE2MBCC_InitReq | Length:XXXXXXXX<br>Command<br>Version<br>Selection-ID<br>Label-ID<br>Quality | Request for initializing reception of a particular selection at a the specified quality level. A (Selection-ID, Quality) pair is the unique identifier for an album in System. |
| MBCC2MCHE_InitReply | Length:XXXXXXXX<br>Command<br>Version<br>Selection-ID<br>Label-ID<br>Quality<br>CSC-size<br>Number-of-tracks<br>repeat{<br>Track-size<br>} | Reply for an InitReq message. A CSC-size of −1 indicates an invalid selection. |

3. Messages Exchanged Between BRCV and End User Device(s) 109

Two (or more) connections are established between the End User Device(s) 109 and the BRCV. One connection, established at initialization time, is for exchanging control messages. The possible control messages are defined below. A data connection is established on-the-fly for each downloaded package (album). The port number assigned for this connection on the End User Device(s) 109 is the unique identifier for this data connection.

| Message type | Attributes | Description |
| --- | --- | --- |
| BRCV2STB_Init | Length:XXXXXXXX<br>Command<br>Version<br>Frequency<br>Mode<br>Program-number<br>Table-ID<br>Package-size | Instruct End User Device(s) 109 to read the PAT of the specified analog channel. |
| STB2BRCV_Ready | Length:XXXXXXXX<br>Command<br>Version<br>Port | End User Device(s) 109 responds to an Init message and passes to PC the port number that the PC connects to in order to start receiving data. |
| STB2BRCV_Error | Length:XXXXXXXX<br>Command<br>Version<br>Message | End User Device(s) 109 error message. |
| BRCV2STB_Stop | Length:XXXXXXXX<br>Command<br>Version<br>Port | Stop delivering sections of the specified package to PC. |

4. Directory Structure for Passing Files from Content Host Emulator 2 to Player
   Application 109 or Play Application Toolkit
   Downloaded files are placed in a directory tree routed at:

$(System)\DOWN LOAD\ where $(System) is system's home defined during installation on end user PC.
   This tree mimics that of the original System content host. Content secure containers (CSC's) are stored in:

$(System)\DOWNLOAD\CSC\{label_id}\{quality}544 {sel_id}.csc where {label_id}, {quality}, and {sel_id} are obtained from the TSC (transaction secure container).
   Selection tracks are stored in:

$(System)\DOWNLOAD\TRACK\{label_id}\{quality}\{sel_id}.{track#} where {label_id}, {quality}, and {sel_id} are obtained from the TSC (transaction secure container). The number of tracks is also obtained from the TSC.

5. Broadcast Receive Layer API
   This section defines the API of the broadcast receive layer (BRCV). The API is System-independent. This API is intended to define a library that the client is linked with and uses in the same execution thread. The System client layer of the Content Host Emulator 2, uses this API to interface to the broadcast receive layer.

int B_Init(char *bcc_host, int TOS, char *payload, int payload_size)
Description:
   Initializes a new connection with the Broadcast Control Center 6.
Arguments:
   bcc_host: Broadcast control center host name.
   TOS: Can be either TOS_STREAM or TOS_DGRAM. This corresponds to a stream or datagram service, respectively. In the stream mode, the client is guaranteed to receive assembled chuncks of the package reliably and in order. In the datagram mode, the client receives sections (which pass the CRC check) as they arrive.
   payload: Initialization message at the client level (MCHE2MBCC_InitReq message).
   payload_size: size of the payload message.
Return Values:
   −1: Error occured.
   package_id: On success, returns a unique identifier for this connection.

char *B_GetBroadcastSchedule(int package_id)
Description:
   Used for obtaining the scheduled times for transmitting the specified package.
Arguments:
   package_id: Connection identifier.
Return Values:
   NULL: If not scheduled.
   Otherwise, returns a pointer to string containing scheduled times as follows:
   start_time=
   end_time=
   start_time=
   end_time= int B_StartReceive(int package_id, (void *)DataHandler (char *data, int size))
Description:
   Start receiving data of the specified package. DataHandler( ) is installed and is invoked whenever data is ready for delivery.
Arguments:
   package_id: Connection identifier.
   DataHandler: This function is invoked by the broadcast layer whenever a chunk of data is ready for delivery to the client.
Return Values:
   −1: On error.
   0: On success.

int B_StopReceive(int package_id)
Description:
   Stop receiving data (consequently uninstall the DataHandler) for the specified package_id.
Arguments:
   package_id: Connection identifier.
Return Values:
   −1: On error.
   0: On success.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:
1. A method for receiving digital content data OD a user's system for playing or recording, said method comprising the steps of:

tuning a receiver to a selected frequency;
receiving content data through a multicast broadcast transmission at the selected frequency by emulating the reception of content data over a unicast connection, wherein the content data has been previously encrypted with a first encrypting key, and a first decrypting key for decrypting the content data is encrypted with a second encrypting key;
assembling the content data that is received, wherein the step of assembling further includes the sub-steps;
determining if all of the content data has been received;
requesting the retransmission of any missing portion of the content data; and
after receiving the missing portions, assembling the missing portion of the content data so as to completely construct the content data;
receiving over a unicast transmission from a clearinghouse the first decrypting key, which has been decrypted using a second decrypting key corresponding to the second encrypting key, wherein the first decrypting key is reencrypted with a third encrypting key from a user's system; and
transferring the content data to a player for playing the content data after all the content data has been received, wherein the content data is decrypted with the first decrypting key after the first decrypting key is decrypted with a third decrypting key corresponding to the third encrypting key.

2. The method according to claim 1, wherein the sub-step of requesting re-transmission includes the sub-step of requesting the missing portion of the content data to be re-transmitted through a broadcast transmission.

3. The method according to claim 1, wherein the sub-step of requesting re-transmission includes the sub-step of requesting the missing portion of the content data to be re-transmitted through a unicast transmission.

4. The method according to claim 1, wherein the content data includes music data and the step of playing includes the sub-step of playing the music data.

5. The method according to claim 1, wherein the step of receiving further includes the sub-steps of:
interfacing a content host emulator to the player; and
emulating a unicast the communication with a content host site during the receipt of the broadcast transmission such tat communication commands between the player and the content host emulator includes at least one communications command that is used between the player and a selected content host during a unicast transmission.

6. The method according to claim 5, wherein the step of emulating further comprises the content host emulator includes all the communications commands that are used between the player and a selected content host during a unicast transmission.

7. The method according to claim 1, wherein the content is the content data is compressed and encrypted with a first encrypting key.

8. The method according to claim 7, further comprising the steps of:
decrypting at least part of the content data with a first decrypting key, which corresponds to the first encrypting key, to produce decrypted content data;
decompressing the decrypted content data to produce decompressed content data; and
playing or recording the decompressed content data.

9. A method for receiving digital content data on a user's system for playing or recording, said method comprising the steps of:
scheduling a time to receive content data;
tuning a receiver to a selected frequency, wherein the step of tuning includes the sub-step of tuning a receiver at the scheduled time;
receiving content data through a multicast broadcast transmission at the selected frequency by emulating the reception of content data over a unicast connection, wherein the content data has been previously encrypted with a first encrypting key, and a first decrypting key for decrypting the content data is encrypted with a second encrypting key;
assembling the content data that is received;
receiving over a unicast transmission from a clearinghouse the first decrypting key, which has been decrypted using a second decrypting key corresponding to the second encrypting key, wherein the first decrypting key is reencrypted with a third encrypting key from a user's system; and
transferring the content data to a player for playing the content data after all the content data has been received, wherein the content data is decrypted with the first decrypting key after the first decrypting key is decrypted with a third decrypting key corresponding to the third encrypting key.

10. A computer readable medium containing program instructions for receiving digital content data on a user's system for playing or recording, said computer readable medium comprising the instructions of:
tuning a receiver to a selected frequency;
receiving content data through a multicast broadcast transmission at the selected frequency by emulating the reception of content data over a unicast connection, wherein the content data has been previously encrypted with a first encrypting key, and a first decrypting key for decrypting the content data is encrypted with a second encrypting key;
assembling the content data that is received, wherein the program instruction for assembling further includes the program instructions of:
determining if all of the content data has been received;
requesting the retransmission of any missing portions of the content data; and
after receiving the missing portions, assembling the missing portion of the content data so as to completely construct the content data;
receiving over a unicast transmission from a clearinghouse the first decrypting key, which has been decrypted using a second decrypting key corresponding to the second encrypting key, wherein the first decrypting key is reencrypted with a third encrypting key from a user's system; and
transferring the content data to a player for playing the content data after all the content data has been received, wherein the content data is decrypted with the first decrypting key after the first decrypting key is decrypted with a third decrypting key corresponding to the third encrypting key.

11. The computer readable medium according to claim 10, wherein the program instruction of receiving further includes the program instructions of:
interfacing a content host emulator to the player; and
emulating a unicast the communication with a content host site during the receipt of the broadcast transmission such tat communication commands between the player and the content host emulator includes at least one communications command that is used between the player and a selected content host dining a unicast transmission.

12. The computer readable medium according to claim 10, wherein the program instruction for requesting re-transmission includes the program instruction for requesting the missing portion of the content data to be re-transmitted through a unicast transmission.

13. The computer readable medium according to claim 10, further comprising the program instruction for:
   scheduling a time to receive the digital content;
   wherein the program instruction for tuning includes the program instruction for tuning a receiver at the scheduled time.

14. The computer readable medium according to claim 10, wherein the content data includes music data and the program instruction for playing includes the program instruction for playing the music data.

15. The computer readable medium according to claim 10, wherein the program instruction for emulating further comprises the content host emulator includes all the communications commands that are used between the player and a selected content host during a unicast transmission.

16. The computer readable medium according to claim 15, wherein the program instruction for requesting re-transmission includes the program instruction for requesting the missing portion of the content data to be re-transmitted through a broadcast transmission.

17. The computer readable medium according to claim 10, wherein the content is the content data is compressed and encrypted with a first encrypting key.

18. The computer readable medium according to claim 17, further comprising the program instructions of:
   decrypting at least part of the content data with a first decrypting key, which corresponds to the first encrypting key, to produce decrypted content data;
   decompressing the decrypted content data to produce decompressed content data; and
   playing or recording the decompressed content data.

19. A information processing system for receiving digital content data on a user's system for playing or recording, said computer readable medium comprising:
   a timer for scheduling a time to receive content data;
   a receiver with tuner for selecting a frequency at the scheduled time;
   means for receiving content data through a multicast broadcast transmission at the selected frequency by emulating the reception of content data over a unicast connection, wherein the content data has been previously encrypted with a first encrypting key, and a first decrypting key for decrypting the content data is encrypted with a second encrypting key;
   a buffer for assembling tho content data that is received,
   receiving over a unicast transmission from a clearinghouse the first decrypting key, which has been decrypted using a second decrypting key corresponding to the second encrypting key, wherein the first decrypting key is reencrypted with a third encrypting key from a user's system; and
   means for transferring the content data to a player for playing the content data after all the content data has been received wherein the content data is decrypted with the first decrypting key after the first decrypting key is decrypted with a third decrypting key corresponding to the third encrypting key.

20. The information processing system according to claim 19, further comprising:
   an interface for interfacing a content host emulator to the player; and
   an emulator for emulating a unicast the communication with a content host site during the receipt of the broadcast transmission such that communication commands between the player and the content host emulator includes at least one communications command that is used between the player and a selected content host during a unicast transmission.

* * * * *